(12) United States Patent
Pasdeloup et al.

(10) Patent No.: US 6,411,691 B1
(45) Date of Patent: Jun. 25, 2002

(54) SYSTEM FOR LOCAL OR REMOTE SWITCHING ON AND OFF OF COMPUTERS AND /OR PERIPHERALS WITH DIFFERENTIATION OF LOCAL AND REMOTE SWITCHING-ON MODE AND SWITCHING-OFF SOFTWARE

(76) Inventors: Gilles Pasdeloup, 11, rue Victor Duruy, F-94190 Villeneuve Saint Georges; Fabrice Laplanche, 56, esplanade Parmentier, F-62600 Berg Plage, both of (FR)

( * ) Notice: Subject to any disclaimer, the term of this patent is extended or adjusted under 35 U.S.C. 154(b) by 0 days.

(21) Appl. No.: 09/462,400

(22) PCT Filed: Jul. 9, 1998

(86) PCT No.: PCT/FR98/01495

§ 371 (c)(1),
(2), (4) Date: Jan. 7, 2000

(87) PCT Pub. No.: WO99/03033

PCT Pub. Date: Jan. 21, 1999

(30) Foreign Application Priority Data

Jul. 9, 1997 (FR) .............................................. 97 08736

(51) Int. Cl.[7] .............................................. H04M 11/00
(52) U.S. Cl. ............................ 379/102.04; 379/102.02; 713/310
(58) Field of Search ....................... 379/102.01–102.04, 379/102.07, 106.01; 713/310, 323

(56) References Cited

U.S. PATENT DOCUMENTS

| | | | |
|---|---|---|---|
| 4,206,444 A | 6/1980 | Ferlan | 340/147 R |
| 4,647,721 A | 3/1987 | Busam et al. | 379/102 |
| 4,701,946 A | 10/1987 | Oliva et al. | 379/98 |
| 5,596,628 A * | 1/1997 | Klein | 379/102.02 |

FOREIGN PATENT DOCUMENTS

| | | | |
|---|---|---|---|
| EP | 0663634 | 7/1995 | G06F/1/26 |
| EP | 0749063 | 12/1996 | G06F/1/32 |

* cited by examiner

*Primary Examiner*—Wing F. Chan
(74) *Attorney, Agent, or Firm*—Ware, Fressola, Van Der Sluys & Adolphson LLP

(57) ABSTRACT

The invention concerns a system for local or remote switching on and off of computers and/or peripherals with differentiation of local and remote switching-on mode and switching-off software, enabling to switch on a computer (4) and/or all or part of its peripherals (5) manually by the user or by sensing a calling signal coming through a digital or analog communication network (20), whether or not there is a communication interface powered or not (5), without requiring previous put through call. Said two switch-on modes are differentiated by the operation of software means particular to the system and permanently available on the computer. The switching-on mode signal is permanently available. The switching-on of certain peripherals can be made conditional to the local or remote switching-on mode. The invention enables to switch off a computer (4) and all or part of its peripherals (5) by operating software means particular to the system and permanently available. Said software means can be automatically or manually activated, either locally or remotely.

20 Claims, 4 Drawing Sheets

SYSTEM FOR LOCAL OR REMOTE SWITCHING ON AND OFF OF COMPUTERS AND /OR PERIPHERALS WITH DIFFERENTIATION OF LOCAL AND REMOTE SWITCHING-ON MODE AND SWITCHING-OFF SOFTWARE

BACKGROUND OF INVENTION

1. Field of Invention

System for local or remote switching on and off of computers and/or peripherals with differentiation of local and remote switching-on mode and switching-off software.

2. Description of Related Art

The present invention relates to a system for local remote control switching on and off for computers and/or peripheral devices with differentiation of mode for local and remote switching-on and switching-off by software.

It is currently known to leave the computer switched-on in a given configuration to retain a possibility of communication for remote access, reception or transmission of information. In this case, the user runs the risk of forgetting to run the communication software or putting it on stand-by when he leaves his desk, or leaving several software programs or applications whose association is difficult, impossible or unstable, thus making communication impossible.

It is also known to switch-on a computer by remote control with the same or another purpose by using for example a system such as the one which is described below (U.S. Pat. No. 4,206,444). The powering up of the computer is performed after the establishment of communication with an external modem which is turned on and on receipt of a particular signal by the invention. The powering off is performed when the communication is interrupted or after the establishment of communication with an external modem which is turned on and on receipt of a particular signal.

This system only works if an external modem, which is turned-on, is connected to the remote computer. The external modem, which is continually turned-on, may be blocked after a communication, thus preventing any further communication.

This system also imposes one of the following alternatives:

The computer is always used in the same configuration.

The user is obliged to change the computer's configuration when switching-on and before switching-off in order to adapt it to local use or remote use.

SUMMARY OF THE INVENTION

The computer can only power itself off automatically if a communication is taking place.

An object of the present invention relates to a system for local or remote control switching on and off for computers and/or peripheral devices with differentiation of mode for local and remote switching-on and switching-off by software. The present invention is connected directly to the communication network and does not require the presence of an external communication interface, which is turned-on in order to operate. The present invention enables the configuration chosen for local use to be managed without restraint, independently from the one chosen for remote use. The computer can be powered off manually or automatically by a software means dependent on the invention, locally or by remote control. Automatic turning-off does not depend upon a communication taking place.

The switching-on in local mode is characterised by powering up after a manual intervention by a physically present user.

The switching-on in remote mode is characterised by powering up after detection of a call signal on the public or private communication network, analogue (type STN, . . . ) or digital (type Numéris, ISDN, computer network . . . ) to which the invention is connected.

A further object of the present invention is to enable either differentiated or non differentiated power supply for the computer's peripheral devices. The devices supplied by means of the present invention are partially or totally powered up according to the configuration defined, some being switched-on for both local switching-on and remote switching-on, some only being switched-on for local switching-on and others only for remote switching-on.

The invention is made up of an original combination of electronic components matched together and specific software means, which are permanently set up on the computer.

The original combination of electronic components is made up of a control module and one or more power modules. These control and power modules are grouped or split up. They may be in the form of boxes outside or cards inside the computer or may be integrated with a communication interface outside or inside the computer or any combination of these different possibilities.

The invention's control module is connected to an access point of a communication network, to the computer, to the supply circuit and to the power modules(s). The power modules are connected to the control module, to the supply circuit and to the computer's power supply input, and possibly to the power supply inputs of all or part of the peripheral devices.

Other characteristics and advantages of the present invention will become clear from the following description, given by way of a non limitative example, with reference to the drawings in which:

DETAILED DESCRIPTION OF THE INVENTION

Figure 1:
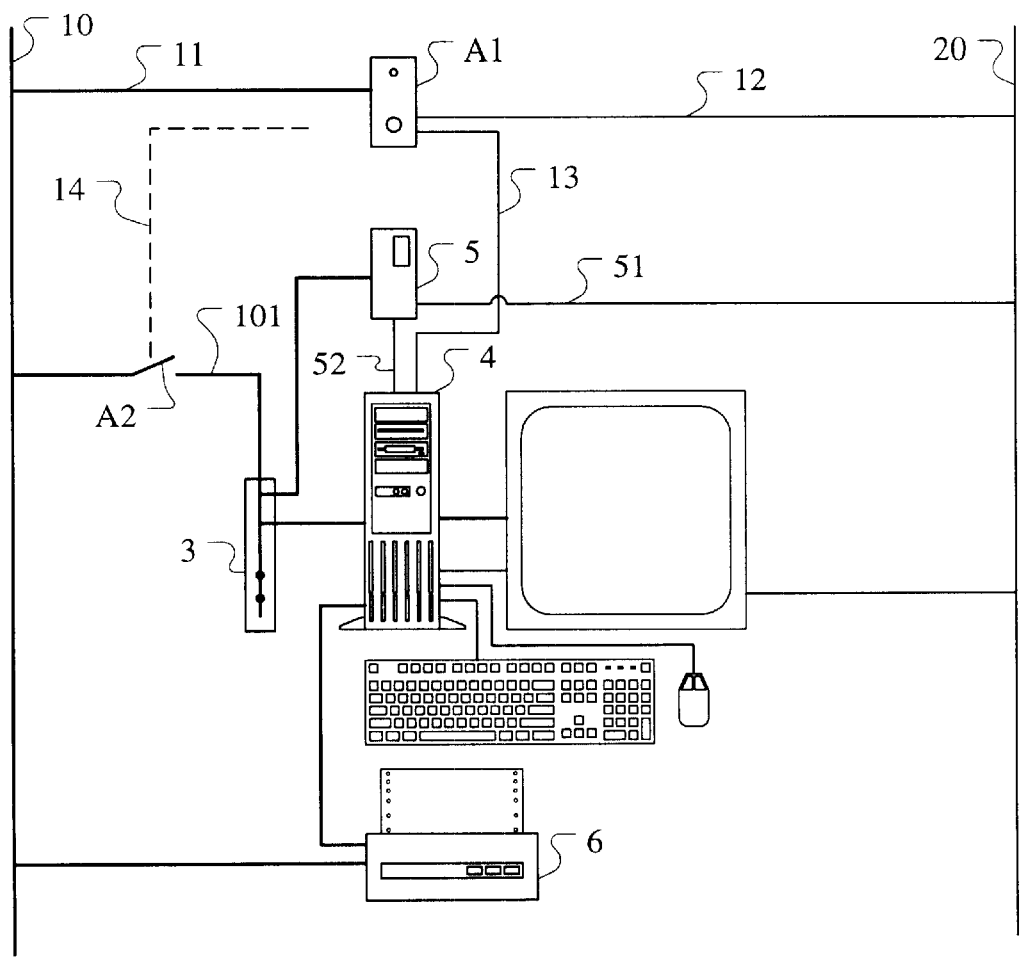
FIG. 1 is a block diagram of a form of implementation of the process according to the invention in a variation comprising a single power module.

In FIG. 1, the block diagram of a known communicating computer configuration is shown into which a device according to the invention may be introduced. The invention's control module (A1) is continuously supplied with electricity by the connection (11), is connected to the public or private analogue or digital communication network (20) by connection (12), is connected to the computer (4) by connection (13), is connected to the supply relay (A2) by connection (14).

The computer (4) and an external communication interface (5) are supplied with power by means of a power relay (A2) controlling the passage or not of electricity towards the power supply box (3) which is part of the invention in one of its variations.

The external communication device (5) is connected to the communication network (20) by connection (51) and to the computer by connection (52).

A printing peripheral device (6) is supplied independently from the invention.

Figure 2:
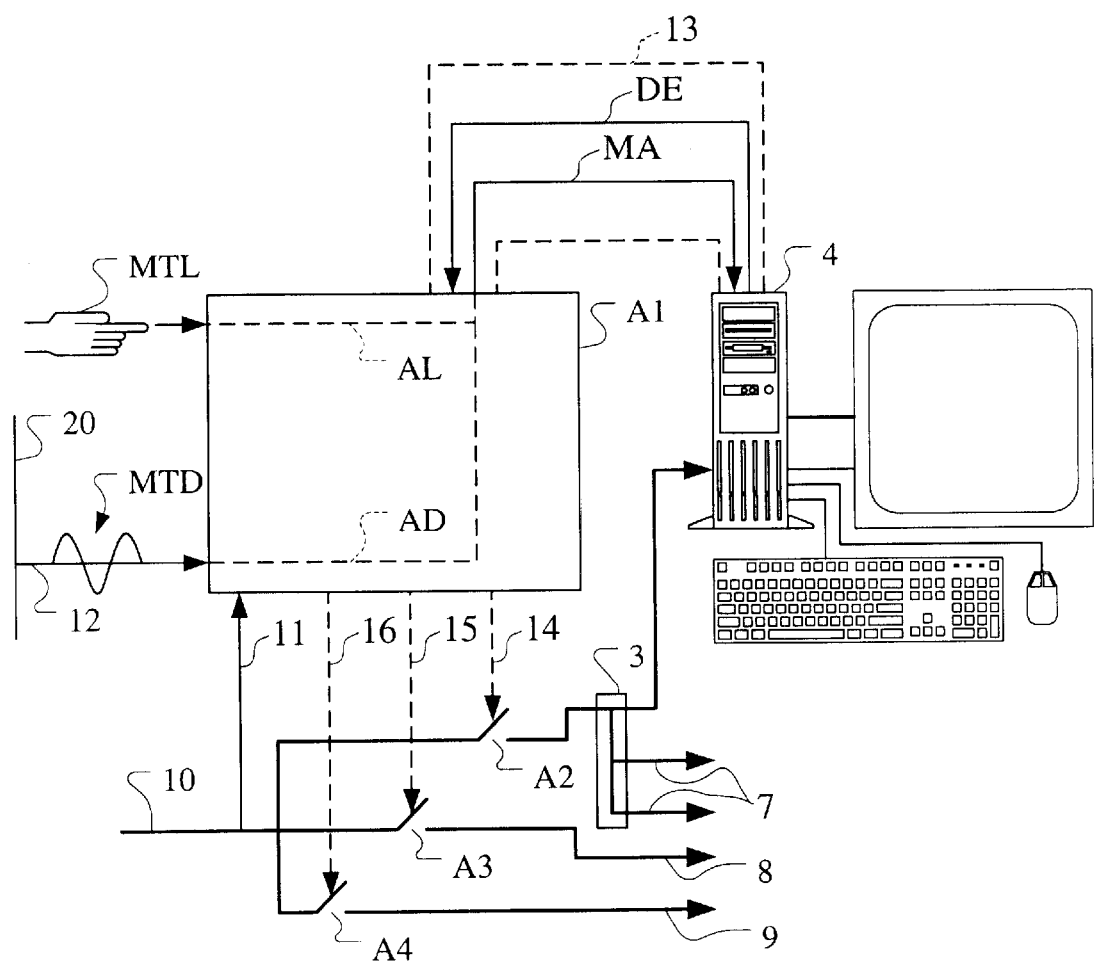
FIG. 2 is a diagram describing the inputs/outputs of commands and power in a variation comprising three power modules.

In FIG. 2, the diagram of inputs/outputs of commands and power is shown according to the specific functions of the invention.

The electricity from the mains (10) directly supplies the invention's control module (A1) and the input of power relays (A2/A3/A4). The power module (A2) is connected to the control module (A1) by connection (14), the power module (A3) is connected to the control module (A1) by connection (15), the power module (A4) is connected to the control module (A1) by connection (15). The output of the power relays (A2) is connected to the power supply box (3), which supplies the computer (4) and the devices (7) to be powered up at the same time as the computer. The output of the power relay (A3) is connected to the peripheral device(s) (8) to be powered up only if the switching on is local (AL). The output of the power relay (A4) is connected to the peripheral device(s) (9) to be powered up only if the switching-on is remote (AD).

The computer (4) and some of its peripheral devices (7) are connected to the supply circuit by means of a power supply box (3).

The powering up of the computer (4) and peripheral devices (7) is performed by detection of a call signal (MTD) on the communication network (20) to which the invention's control module (A1) is connected or by a local powering up action (MTL) carried out by a physically present user. In both cases, the control module closes the power relay (A2) thereby letting electricity pass towards the power supply box (3), thereby ensuring the powering up of the computer (4) and its peripheral devices (7). In the case of local switching-on (MTL), the peripheral device(s) (8) supplied by the power relay (A3) are powered up. In the case of remote switching-on (MTD), the peripheral device(s) (9) supplied by the power relay (A4) are powered up.

The control module (A1) transmits a signal for switching-on mode (MA) to the computer (4). This signal indicates a remote switching-on (AD) if the switching-on is remote (MTD) or local switching-on (AL) if the switching-on is local (MTL). This signal (MA) is transmitted by connection (13) to the computer (4) which is able to interpret it (see the flow chart shown in FIG. 3).

The signal for requesting switching-off (DE) is transmitted to the invention's control module (A1) by connection (13). The power relay (A2) opens the electric circuit and stops supplying the power supply box, thereby powering off the computer (4) and the peripheral devices (7). The power relay (A3) opens the electric circuit and stops supplying the peripheral device(s) (8). The power relay (A4) opens the electric circuit and stops supplying the peripheral device(s) (9).

Figure 3:
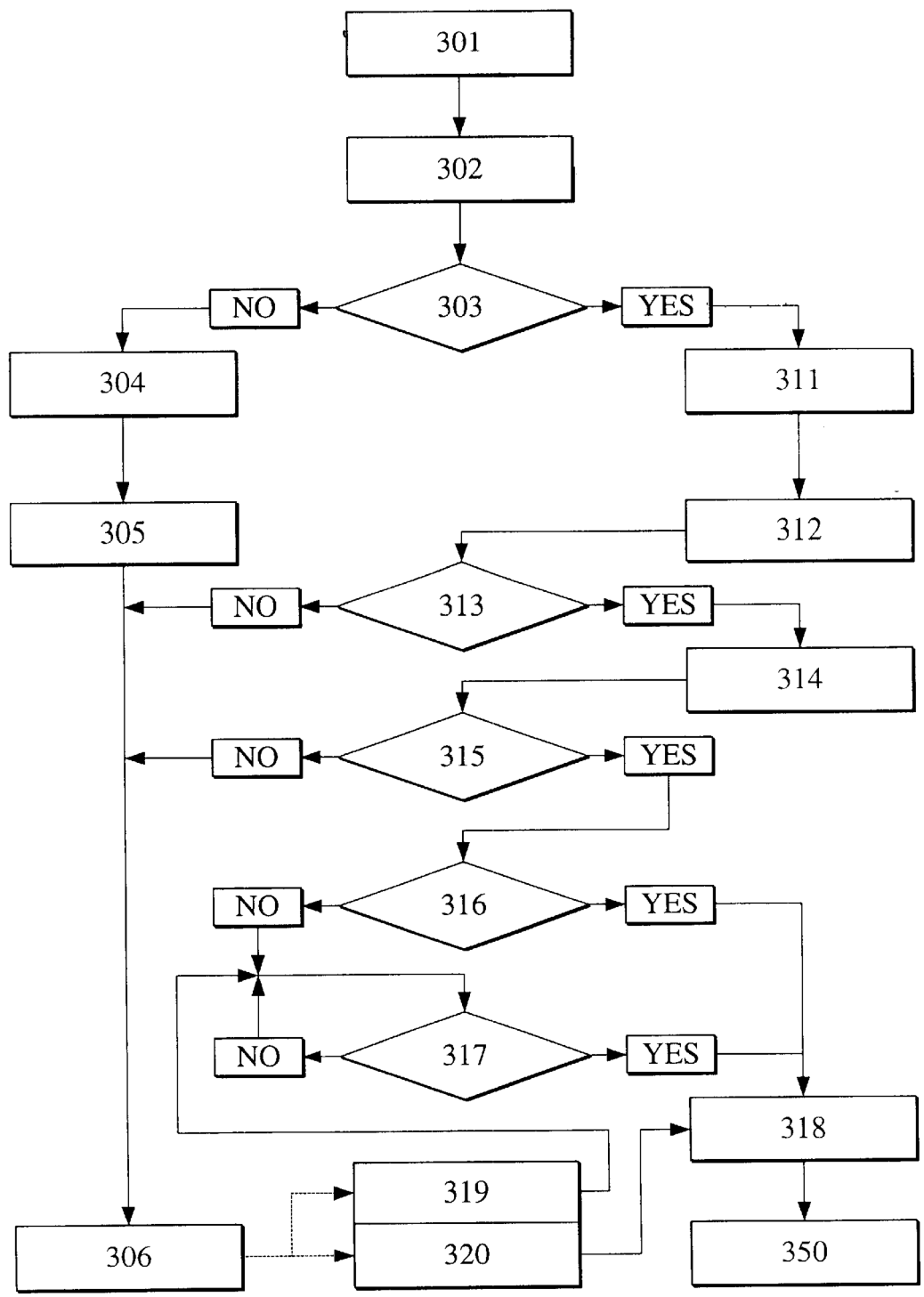
FIG. 3 is a flow chart describing for the case of the practical application of the process, a non limitative form of logical implementation of the invention between the different ways of powering up the computer and the different ways of powering it off.

In FIG. 3, the logical mode of operation is shown in the form of a tree structure according to the practical example of implementation of the invention described herein.

Stage (301) is the manual (local) or remote (by detection of telephone ring) powering up of the computer. Stage (302) is the test of turning-on mode by the appropriate software function.

Stage (303) interprets the result of test (302), if the result is NO, the process continues with (304), if the result is YES, the process continues on to (311).

Stage (304) is the result of a NO during stage (303), this is recognition of local switching-on mode. It continues on to (305) by initialising the computer in its normal configuration for a local use and ends with (306), when the computer is switched-on in a certain configuration.

Stage (311) is the result of a YES during stage (303), this is recognition of remote switching-on mode, it continues on to stage (312), during which the computer is initialised in a configuration specific to remote switching-on mode. This configuration can partially or totally be the sane as the local configuration of stage (304).

In (313) there is a test to see whether there are commands or programmes specific to remote mode to be run, if the result is YES, the process continues on to (314), if the result is NO, the process ends with (306).

Stage (314) is the result of a YES during stage (313), the programmes or commands specific to remote switching-on mode are run before the process continues on to (315).

In stage (315) there is a test to see whether the parameters include a direct turning-off order, or a turning-off order dependent on one or more conditions (examples of conditions: communication ended, procedure ended, printing ended, etc.), if the result is NO, the process ends with (306), if the result is YES, the process continues on to (316).

Stage (316) is the result of a YES during stage (315), there is a test to see whether the switching-off order is direct, if the answer is NO, the process continues on to (317), if the answer is YES, the process continues on to (318).

Stage (317) is the result of a NO during stage (316), there is a test to see whether the preset switching-off condition or conditions are respected, if the result is NO, one remains in (317), if the result is YES, the process continues on to (318).

Stage (318) is the execution of the switching-off order, if the switching-off order is executed under a Microsoft "WINDOWS" type environment, the programmes, which are running and the environment are exited before continuing the process on to (350).

In stage (350) the invention cuts-off the power supply to the computer and any of its peripheral devices.

When the process is in stage (306) switching-off can be requested by following the stages (319) or (320).

In stage (319) a conditional switching-off is requested by a user working on the computer or by a programme operating locally, by a user working by remote control by means of another computer connected by any type of communication link or by a programme operating on another computer connected by any type of communication link. The procedure continues on to stage (317).

In stage (320), a direct switching-off is requested by a user working on the computer or by a programme working locally, by a user working by remote control by means of another computer connected by any type of communication link or by a programme operating on another computer connected by any type of communication link. The procedure continues on to stage (318).

Figure 4:
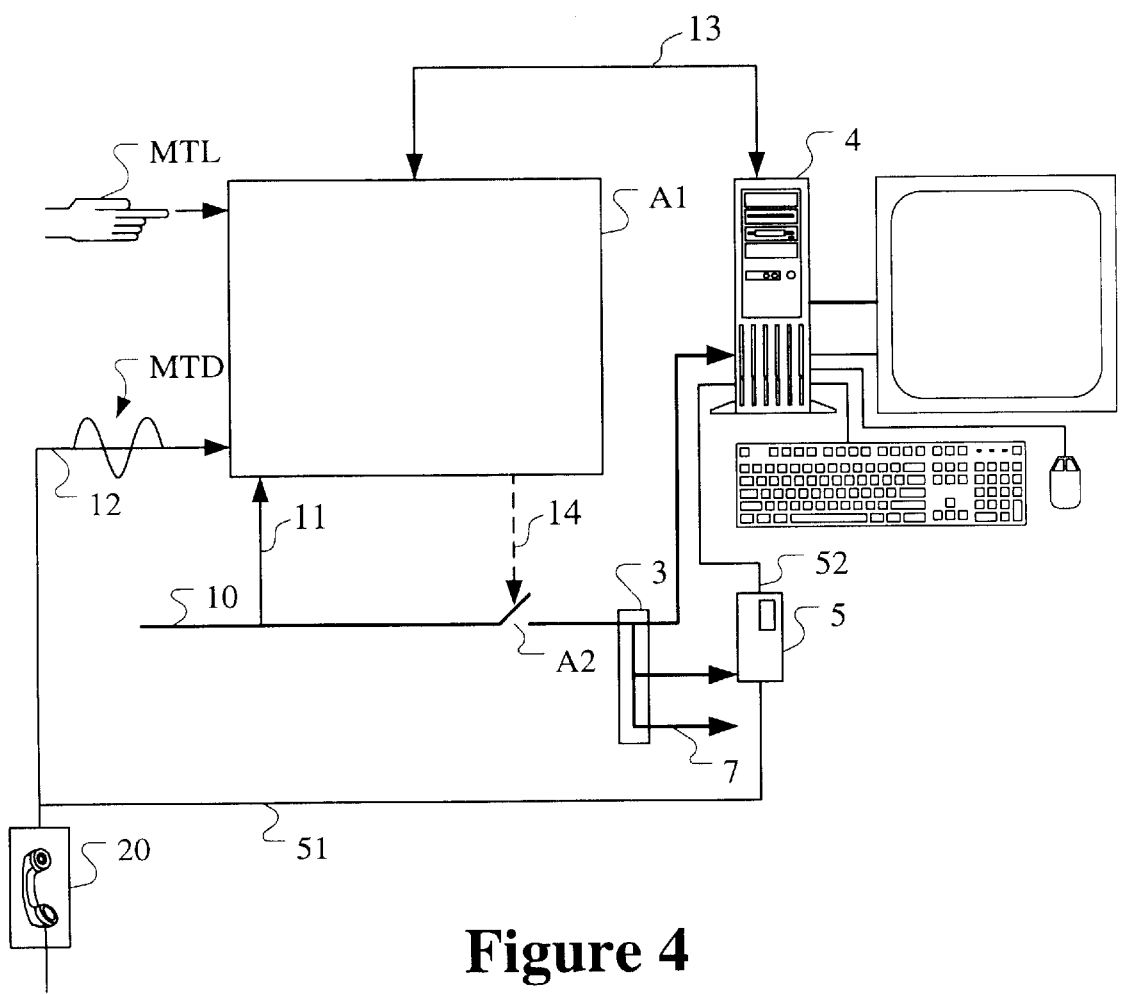
FIG. 4 is a block diagram describing the inputs and outputs of commands and of power for the practical application of the process according to the invention.

In FIG. 4, the block diagram of inputs/outputs of commands and power is shown according to the practical example of implementation of the invention described herein.

The electric power from the mains (10) directly supplies the invention's control module (A1) and the input of the power relay (A2). The output of the power relay is connected to the power supply box (3) which supplies the computer (4) and its peripheral devices (5 & 7).

The computer (4) and some of its peripheral devices (5 & 7) are connected to the mains by means of the power supply box (3).

The powering up of the computer (4) and the peripheral devices (5 & 7) is carried out by detection of a call signal (MTD) on the private or public switched telephone network (20) to which the invention's control module (1) is connected, or by a physically present user pressing a button on the invention's control box (MTL). In both cases, the control module closes the power relay (A2) thereby letting electric power pass to the power supply box (3), which powers up the computer (4) and its peripheral devices (5 & 7).

The control module (A1) transmits a signal for switching-on mode to the computer (4). This signal indicates a remote switching-on (AD) if the switching-on is remote (MTD) or local switching-on (AL) if the switching-on is local (MTL). This signal is transmitted by connection (13) to the computer (4) which is able to interpret it (see the flow chart shown in FIG. 3).

The signal for requesting switching-off is transmitted to the invention's control module (A1) by connection (13). The power relay (A2) opens the electric circuit and stops supplying the power supply box, thereby switching-off the computer (4) and the peripheral devices (5 & 7).

In a preferred embodiment of realisation of the present invention:

The invention's control module (A1) is supplied by means of a connection to the mains (11).

The invention's control module (A1) is connected to the computer by a serial, parallel or another connection (13).

The invention's control module (A1) is connected to a public or private communication network (20), analogue (type STN, ...) or digital (type Numéris, ISDN, computer network ...) by a connection (12).

The computer is either connected or not to one or more public or private communication networks, analogue (type STN, ...) and/or digital (type Numéris, ISDN, computer network ...) (20) by means of appropriate communication interfaces (5).

The computer is connected to the mains (10) by means of the power relay (A2) of the present invention by a connection (101). This connection operates directly or by means of an intermediate power supply box (3).

The computer may or may not have peripheral devices (non-exhaustive list: printer, communication interface ...) (5 & 6).

Some of the possible peripheral devices are connected to the mains by means of the power relay of the present invention (5 & 7).

Some of the possible peripheral devices are connected directly to the mains (6).

The present invention permits the computer and its possible peripheral devices to be powered up in two different, differentiated ways, which are defined below.

The local mode of activating the powering up of the computer (4) is characterised by the physical intervention (MTL) of a user present at the invention's control module (A1).

The remote mode of activating the powering up of the computer (4) is characterised by the detection of a call signal (MTD) on a public or private communication network (20), analogue (type Switched Telephone Network) or digital (type Numéris, ISDN, computer network) to which the invention's control module (A1) is connected, whether or not there is a communication interface (5) present (type modem, codec, ISDN adapter, network adapter ...) which may or may not be supplied with power, without the need to establish a communication beforehand.

The two methods of powering up described previously are differentiated by the execution of a software means dependent on the invention and continuously available on the computer. The signal for switching on mode (AL or AD) is transmitted to the computer by means of a serial, parallel or other connection (13) ensuring the connection with the invention's control module (A1). The invention's control module keeps the signal for switching-on mode continuously available (AL or AD) as long as the computer (4) and its peripheral devices (5 & 7) are switched-on.

When initialising (booting up) the computer and at any other time, the switching-on mode "local" (AL) or "remote" (AD) can be recognized by the computer by executing a software function dependent on the invention. This software function interprets a signal for switching-on mode (AL or AD) transmitted by the invention's control module (A1) to the computer by means of a serial, parallel or other connection (13) and enables the execution of operations (for example and in a non-exhaustive manner: programmes, procedures, processing, initialisation of peripheral devices ...) to be conditioned to remote or local switching-on mode.

According to the "local" (AL) or "distant" (AD) switching-on mode, the devices connected to the mains by means of the invention are partially or totally powered up according to the configuration defined. The devices connected directly to the mains do not undergo any change of status.

The present invention enables the powering off of a computer (4) and all or part of its peripheral devices (5 & 7) by a software means dependent on the invention and continuously available on the computer.

Its execution can be activated:

by the intervention of a physically present user, by a programme, by a programme verifying that one or more conditions are fulfilled such as for example and in a non-exhaustive manner: interruption of a communication, end of processing, end of printing, set switching-off time, etc.

by another computer connected by means of any sort of communication link such as for example and in a non-exhaustive way (private or public telephone network, private or public digital network, data transmission computer network, etc) and using an appropriate communication software programme operating automatically or manually and enabling the transmission of commands to be executed by remote control.

The following description is an example of an application of the present invention with the purpose of illustrating the patent. This application does not pretend to be exhaustive nor to limit the scope of application of the invention and may be subjected to numerous modifications or variations both in its form and in its uses.

The system described herein enables a PC or compatible type micro computer (and its peripheral devices) to be powered up locally or by remote control. It equips the PC with a local or remote controlled switching-off software. The switching-off request being activated by execution of a software command continuously available on the computer.

The system includes a control module connected to the computer by a standard parallel or serial port, to a continuous source of electrical power, to a private or public analogue telecommunication network of type STN and to a power relay controlling the passing or not of electric power to the computer. The connection to the telecommunications network operates ahead of the modem and independently of the latter. The modem can be internal or external, with or without power.

Locally, the PC and any possible peripheral devices are powered up by pressing a button situated on the front of the invention's control module instead of the usual computer button.

In remote control, the PC and any possible peripheral devices are powered up by detection of one or more rings on the public or private telephone line (STN) to which the invention's control box is connected.

When powered off, the computer is continuously available both for local switching-on and switching-on by telephone due to the permanent stand-by mode of the invention's control module.

The software means dependent on the invention enable a second boot to be determined, reserved for telephonic switching-on, and transparent for the local user. The recognition of the switching-on mode is done automatically when switching-on or at any other time. It is the user who determines the software DOS or Windows to be run in remote mode.

Switching-off is done by clicking on a dedicated icon in Windows or by executing a dedicated command in "DOS" or "Windows".

In local mode, switching-off can be manual, integrated in batch files, in command macros, executed directly from a programme or following the meeting of one or more determined conditions (at a defined time, at the end of printing, at the end of processing, etc.).

In remote mode, apart from the switching-off possibilities which local mode has, switching-off can be done automatically at the end of communication, with or without delay. The switching-off is in no way obligatory.

In all cases, switching-off can be requested by a remote operator working on a computer connected to the computer equipped with the invention through any type of communication link. The switching-off can also be requested by another computer operating without an operator and connected by means of any type of communication link to the computer equipped with the invention.

Due to an appropriate communication software programme, the user can carry out a macro control and start its execution on simple detection of a telephone call, without prior connection by the remote computer. It can also arrange regular and automatic transfer and collection of files, whatever the number of remote stations and their location, or pick-ups by call from the remote station, in order to eliminate any risk of hacking into the system.

With a power supply box driven by the invention, the external modems are only supplied with power when the PC is switched-on, thus eliminating the risk of blocking. The printer, supplied by the same means, remains available without being continually powered up.

What is claimed is:

1. A device for controlling a power supply enabling the powering up of a computer and all or part of possible peripheral devices thereof either by the intervention of a physically present user, also known as a Local switching-on (AL), or by detection of a call signal coming into the communication network to which the device is connected, also known as a Remote control switching-on (AD), the communication network being a public or private analogue telephone network (Type STN), or a public or private digital network (Type Numéris, ISDN, computer network for data transmission), characterized in that the device comprises:

a first hardware means, made up of a control module (A1) and a power module (A2) either grouped or split up, inside or outside the computer, independent or integrated into a peripheral communication device, constituted as an autonomous group or an integrated subgroup, the control module (A1) being connected to an access point of a communication network, to the computer, to the power module (A2) and to the mains supply, and the power module (A2) being connected to the control module (A1), to the mains supply and to the power supply input of the computer and the power supply input of all or part of the possible peripheral devices; when the computer (4) is powered up, the control module (A1) continually transmitting a switched-on mode (MA) signal; and a second software means permanently set up on the computer and continuously accessible; the second software means including at least one software function enabling the differentiation of the local switching-on mode (AL) from the remote switching-on mode (AD) by interpreting a switching-on mode signal (MA) transmitted by the control module (A1) and a software function enabling the transmission of a powering off order (DE) to the control module (A1).

2. A device for controlling power supply according to claim 1, characterized in the first hardware means includes a second power module (A3) connected to the control module (A1), to the mains supply, and to the power supply input of certain peripheral devices which are not connected to the means (A2).

3. A device for controlling power supply according to claim 1, characterized in that the first hardware means includes a third power module (A4) connected to the control module (A1), to the mains supply, and to the power supply input of certain peripheral devices which are not connected to the means (A2) and (A3).

4. A device for controlling power supply according to claim 1 characterized in that the local mode of activating the powering up of the computer (4) is carried out by physical intervention (MTL) of a user present on the invention's control module (A1).

5. A device for controlling power supply according to claim 1 characterized in that the remote mode of activating the powering up of the computer (4) is carried out by detection of a call signal (MTD) on a private or public communication network, analogue (type Switched Telephone Network) or digital (type Numéris, ISDN, computer network) to which the control module (A1) is connected, whether or not there is a communication interface present (type modem, codec, ISDN adapter, network adapter) supplied with power or not, without the need to establish a communication beforehand.

6. A device for controlling power supply according to claim 1 characterized in that the execution on the powered up computer of the software function enabling the transmission of a powering off order permits the transmission to the control module (A1) of a cut-out order affecting the power module (A2), the second power module (A3) and the third power module (A4), and powers off the computer (4) and the peripheral devices for which the power module (A2), the second power module (A3) and the third power module (A4) ensure electric power supply.

7. A device for controlling power supply according to claim 1 characterized in that the powering up according to local mode (AL) or remote mode (AD) influences whether the peripheral devices for which the second power module (A3) or the third power module (A4) ensure power supply are powered up or not.

8. A device for controlling power supply according to claim 2, characterized in that the first hardware means includes a third power module (A4) connected to the control module (A1), to the mains supply, and to the power supply input of certain peripheral devices which are not connected to the power module (A2) and the second power module (A3).

9. A device for controlling power supply according to claim 8, characterized in that the local mode of activating the powering up of the computer (4) is carried out by physical intervention (MTL) of a user present on the control module (A1).

10. A device for controlling power supply according to claim 9, characterized in that the remote mode of activating the powering up of the computer (4) is carried out by detection of a call signal (MTD) on a private or public communication network, analogue (type Switched Telephone Network) or digital (type Numéris, ISDN, computer network) to which the invention's control module (A1) is connected, whether or not there is a communication interface present (type modem, codec, ISDN adapter, network adapter) supplied with power or not, without the need to establish a communication beforehand.

11. A device for controlling power supply according to claim 10, characterized in that the execution on the powered up computer of the software function enabling the transmission of a powering off order permits the transmission to the control module (A1) of a cut-out order affecting the power module (A2), the second power module (A3) and the third power module (A4), and powers off the computer (4) and the peripheral devices for which the power module (A2), the second power module (A3) and the third power module (A4) ensure electric power supply.

12. A device for controlling power supply according to claim 11, characterized in that the powering up according to local mode (AL) or remote mode (AD) influences whether the peripheral devices for which the second power module (A3) or the third power module (A4) ensure power supply are powered up or not.

13. A device for controlling power supply according to claim 2, characterized in that the local mode of activating the powering up of the computer (4) is carried out by physical intervention (MTL) of a user present on the invention's control module (A1).

14. A device for controlling power supply according to claim 2, characterized in that the remote mode of activating the powering up of the computer (4) is carried out by detection of a call signal (MTD) on a private or public communication network, analogue (type Switched Telephone Network) or digital (type Numéris, ISDN, computer network) to which the invention's control module (A1) is connected, whether or not there is a communication interface present (type modem, codec, ISDN adapter, network adapter) supplied with power or not, without the need to establish a communication beforehand.

15. A device for controlling power supply according to claim 2, characterized in that the execution on the powered up computer of the software function enabling the transmission of a powering off order permits the transmission to the control module (A1) of a cut-out order affecting the power module (A2), the second power module (A3) and the third power module (A4), and powers off the computer (4) and the peripheral devices for which the power module (A2), the second power module (A3) and the third power module (A4) ensure electric power supply.

16. A device for controlling power supply according to claim 2, characterized in that the powering up according to local mode (AL) or remote mode (AD) influences whether the peripheral devices for which the second power module (A3) or the third power module (A4) ensure power supply are powered up or not.

17. A device for controlling power supply according to claim 3, characterized in that the remote mode of activating the powering up of the computer (4) is carried out by detection of a call signal (MTD) on a private or public communication network, analogue (type Switched Telephone Network) or digital (type Numéris, ISDN, computer network) to which the invention's control module (A1) is connected, whether or not there is a communication interface present (type modem, codec, ISDN adapter, network adapter) supplied with power or not, without the need to establish a communication beforehand.

18. A device for controlling power supply according to claim 3, characterized in that the execution on the powered up computer of the software function enabling the transmission of a powering off order permits the transmission to the control module (A1) of a cut-out order affecting the power module (A2), the second power module (A3) and the third power module (A4), and powers off the computer (4) and the peripheral devices for which the power module (A2), the second power module (A3) and the third power module (A4) ensure electric power supply.

19. A device for controlling power supply according to claim 3, characterized in that the powering up according to local mode (AL) or remote mode (AD) influences whether the peripheral devices for which the second power module (A3) or the third power module (A4) ensure power supply are powered up or not.

20. A device for controlling power supply according to claim 4, characterized in that the execution on the powered up computer of the software function enabling the transmission of a powering off order permits the transmission to the control module (A1) of a cut-out order affecting the power module (A2), the second power module (A3) and the third power module (A4), and powers off the computer (4) and the peripheral devices for which the power module (A2), the second power module (A3) and the third power module (A4) ensure electric power supply.

* * * * *